Oct. 7, 1958    J. PIROUX    2,855,451
ELECTRIC ACCUMULATORS
Filed Nov. 19, 1954    2 Sheets-Sheet 1

INVENTOR
JEAN PIROUX
BY Young, Emery + Thompson
ATTYS.

Oct. 7, 1958  J. PIROUX  2,855,451
ELECTRIC ACCUMULATORS
Filed Nov. 19, 1954  2 Sheets-Sheet 2
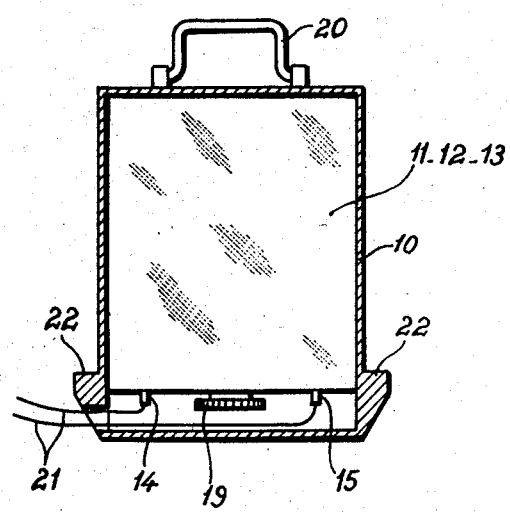
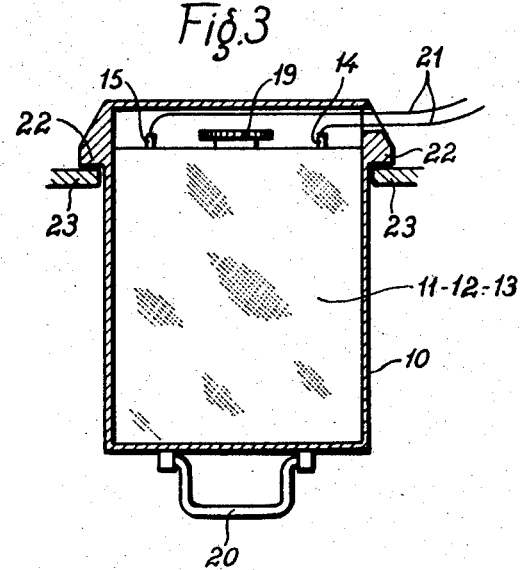
INVENTOR
JEAN PIROUX
BY Young, Emery & Thompson
ATTYS.

United States Patent Office 2,855,451
Patented Oct. 7, 1958

2,855,451

ELECTRIC ACCUMULATORS

Jean Piroux, Villemomble, France

Application November 19, 1954, Serial No. 470,107

Claims priority, application France November 26, 1953

5 Claims. (Cl. 136—76)

The present invention has for its object improvements in electric accumulators, and especially in fluid-tight electric accumulators which comprise plate electrodes mounted very close to each other and enclosed in hermetically-closed containers, very thin separators being arranged between the said electrodes and in contact therewith.

In accumulators of this kind, the assembly comprised by the electrodes and the separators forms a porous block which is able to retain by capillary action the electrolyte required for the electro-chemical reaction.

Now, it has been found that the operation of such accumulators in fluid-tight containers is not always satisfactory; in particular, the internal pressure of the accumulator at the end of the charging period increases sometimes in an unacceptable manner. Two accumulators, of apparently identical appearance, may have widely different internal pressures at the end of the charging period.

The present invention has for its object to remedy this drawback by ensuring in accumulators of the kind referred to, a sure operation without excessive internal pressures.

The improvements in accordance with the invention are characterised in that the block formed by the electrodes and the separators is saturated with electrolyte before the forming charge and, after having proceeded to this forming charge, all the free electrolyte contained in the receptacle is evacuated at the end of the forming charge, that is to say at the commencement of the evolution of gas to which this charge gives rise.

The applicant has found, in fact, that in providing the accumulator with the quantity of electrolyte which exactly saturates the electrodes and separators at the end of the charge, and by driving out the excess electrolyte, the uncertainties and differences in the operation of fluid-tight accumulators were avoided.

After the removal of the excess electrolyte, there only remains in the interior of the receptacle the block of separators and plates impregnated with a small quantity of electrolyte, that is to say without free electrolyte.

In order to evacuate the electrolyte in excess, the casing containing the accumulator is preferably placed in a reverse position during the forming charge, so that the liquid is eliminated by gravity.

It may happen, however, that gravity alone does not suffice to cause the expulsion of the electrolyte forced out by the evolution of gas; the assembly of the plate electrodes and the separators being porous may, in fact, retain the excess electrolyte by capillarity. The evacuation of this excess is then assisted by introducing through the filling orifice, in contact with the plates and the separators, a cotton wick which sucks-up the excess electrolyte.

After it has been hermetically closed, the accumulator thus constituted may be charged in the normal way, or may even be over-charged. The internal pressure becomes stable during the over-charge at an acceptable value which may, furthermore, be determined in advance.

In fact, the higher the intensity of the forming charge, the greater is the evolution of gas at the end of the charging period, and, in consequence, the greater the quantity of electrolyte expelled. Conversely, the more the quantity of electrolyte left in the accumulator is reduced, the greater will be the capacity of the accumulator, closed in a fluid-tight manner, for withstanding a high intensity of over-charge without creating an inadmissible internal over-pressure.

The very small quantity of electrolyte which is left between the electrodes is sufficient to ensure the phenomena of normal charge and discharge.

When the electrolyte begins to decompose, the gases which are formed on one of the plate electrodes soon cover the whole surface of the plate and, as the distance between the plates is very small, the bubbles of gas very quickly make contact with the other plate, thus interrupting the electrolysis and preventing, in consequence, any increase in pressure inside the container.

The corresponding pressure depends on the thickness of the separators, and its value becomes lower as this thickness is reduced.

The quantity of electrolyte thus retained in the accumulator being very small, it is clearly important that this electrolyte should always be uniformly distributed throughout the block of plates and separators, or in other words, that the whole surface of the plates and the separators should be uniformly wetted by the elctrolyte. To this end, there is added to the electrolyte a wetting agent which is chemically compatible with the electrolyte employed.

It is, however, impossible to remove the accumulator from the action of gravity which tends to collect the electrolyte together at the lowest point of the container and, in practice, it is not possible to avoid shocks or accelerations on the accumulator, and these also tend to vary the distribution of the electrolyte.

In order to reduce the mobility of the electrolyte in the block of plates and separators, there may be added to it with advantage an element which increases its viscosity, of the same kind as those agents known by the name of "thickeners." A thickener which is particularly advantageous for the majority of accumulators is polyvinyl alcohol which has the additional advantage of having the properties of a wetting agent.

In spite of the reduction in mobiliity of the electrolyte obtained in this way, a partial fall of this electrolyte into the bottom of the receptacle containing the block of plates and separators may take place in course of time.

In order to remedy this, that is to say in order to bring back the electrolyte into the block of plates and separators and to distribute it once more uniformly in this block, the position in space of the accumulator is periodically varied, preferably by turning it upside down from time to time. In particular, in the case of accumulators forming part of portable apparatus, the reversals in position are effected by carrying out the charging of the accumulator in the inverted position.

A method of using accumulators in accordance with the invention consists in providing them with openings at the bottom for normal service, whilst during charging the openings are located at the top.

As charging tends to expel the electrolyte as a result of the evolution of gas, any leakages which take place do not result in any loss of electrolyte. On the contrary, during the discharge period, the gases are re-absorbed and the accumulator is under a depression; no leakage is therefore to be feared, even when the openings are directed downwards.

The attached drawings show by way of example the method of manufacture and of use of an accumulator in accordance with the invention.

Fig. 2 shows the accumulator in its position of use.

Fig. 3 shows the accumulator in course of re-charging.

Figure 1:
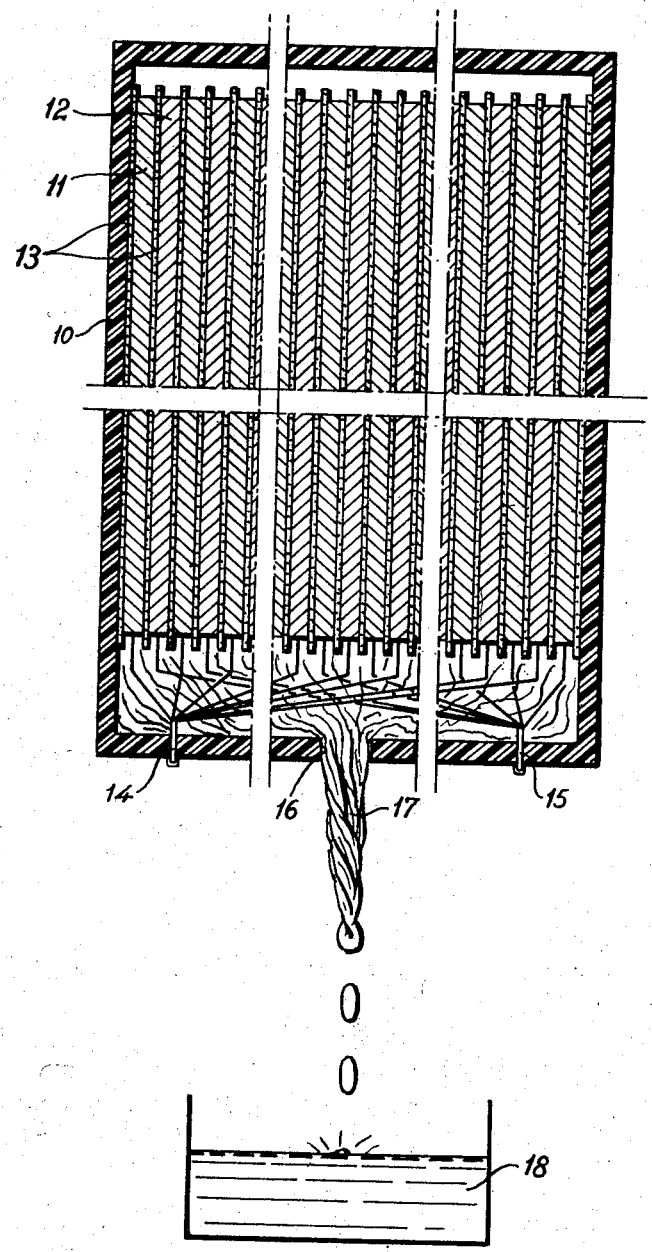
Fig. 1 shows in diagrammatic cross-section the construction of the accumulator and its method of formation.

The accumulator comprises an electrolytic element mounted in a container 10 and formed of plates 11, 12 of sheet metal containing active materials which are respectively positive and negative. These plates are stacked together with the interposition of separator layers 13 consisting of thin fabric, woven for example from artificial textile threads of the nylon type, and having a diameter of few hundredths of a millimeter.

The assembly of the plates 11, 12 and the separators 13 is pressed together to form a block housed in the container 10 which is arranged to be closed in a fluid-tight manner. The plates of sheet metal 11 are connected to the terminal 14 and the plates 12 are connected to the terminal 15.

To carry out the formation of the accumulator, the container 10 is filled through the orifice 16 with electrolyte so as to saturate the block 11, 12, 13. A cotton wick 17 is then introduced through the orifice 16 so as to come into contact with the block 11, 12, 13. The whole unit is then turned upside down to the position shown in Fig. 1 and the terminals 14 and 15 are then connected to the poles of a source of direct current.

The voltage at the terminals rises to a value depending of the nature of the active materials. With steel electrodes, for instance, the voltage arises about to 2.10 volts. The excess electrolyte is expelled and flows through the wick 17 into a receptacle 18 from which it is collected. When the flow of electrolyte has ceased, the wick 17 is removed and the container 10 is closed in a fluid-tight manner by means of a plug 19 which closes the orifice 16.

If the accumulator element thus formed has subsequently passed through it a direct current equal to the value of the formation current, the internal pressure remains steady at a low value which is less than two atmospheres, the voltage taking place at a value inferior to the one hereabove defined; with steel electrodes, for instance, at about 1.8 volts.

The accumulator thus constituted is provided with a handle 20. This is placed on the side opposite to the terminals 14 and 15 and the plug 19. Wires 21 are connected to the terminals 14 and 15. The container 10 is provided with two lugs 22.

When in use, the accumulator is arranged as shown in Fig. 2, with the terminals 14 and 15 at the bottom.

When the accumulator is discharged, its re-charging is carried out in the position shown in Fig. 3, that is to say by turning the container upside down and resting the lugs 22 on a support 23, the handle 20 being now at the bottom, the terminals 14 and 15 and the plug 19 at the top.

The container is preferably arranged in such a way that the placing of the accumulator in the position of Fig. 3 automatically establishes the necessary connection.

What I claim is:

1. A method of manufacture of fluid-tight electric accumulators comprising a fluid-tight container, in this container a block constituted by a stack of plate electrodes and thin separators, the said method comprising: filling the said container with electrolyte in sufficient quantity to saturate the block of electrodes and separators, then reversing the position of the container and in connecting the accumulator to a source of current which ensures its electric formation, and in expelling out of the container, the excess of electrolyte which is not retained by the block, at the end of the charging period when the evolution of gas begins and closing said container in a fluid-tight manner after completion of said expelling out the excess of electrolyte.

2. A method of manufacture for a fluid-tight electric accumulator comprising a fluid-tight container, in this container a block constituted by a stack of plate electrodes and thin separators, the said method consisting in filling the said container with electrolyte in a sufficient quantity to saturate the block of electrodes and separators, then in turning the container upside down and in connecting the accumulator to a source of current which ensures its electric formation, and in expelling out of the container, by means of a wick, the excess of electrolyte which is not retained by the block, at the end of the charging period when the evolution of gas begins and closing said container in a fluid-tight manner after completion of said expelling out the excess of electrolyte.

3. A method of manufacture for a fluid-tight electric accumulator comprising a fluid-tight container, in this container a block constituted by a stack of plate electrodes and thin separators, the said method consisting in filling the said container with electrolyte to which is added polyvinyl alcohol, the quantity of the said electrolyte being sufficient to saturate the block of electrodes and separators, then in turning the container upside down and in connecting the accumulator to a source of current which ensures its electric formation, and in expelling out of the container the excess of electrolyte which is not retained by the block, at the end of the charging period when the evolution of gas begins and closing said container in a fluid-tight manner after completion of said expelling out the excess of electrolyte.

4. In a method of manufacturing a fluid-tight electric accumulator comprising a container having a plurality of alternate adjacent electrode plates and separators, said separators being impregnated with electrolyte, the steps of discharging the excess of electrolyte liquid non-absorbed by the separators, when the evolution of gas has begun during the initial formation charge, and of closing said accumulator in a fluid-tight manner only when said discharge has been completed.

5. In a method of manufacturing a fluid-tight electric accumulator comprising a container having a plurality of alternate adjacent electrode plates and separators, said separators being impregnated with electrolyte, the steps of discharging the excess of electrolyte liquid non-absorbed by the separators, when the evolution of gas has begun during the initial formation charge, said accumulator being tilted and said excess of electrolyte being discharged by gravity, and of closing said accumulator in a fluid-tight manner only when said discharge by gravity has been completed.

References Cited in the file of this patent

UNITED STATES PATENTS

| 340,474 | Armstrong | Apr. 20, 1886 |
| 380,971 | Armstrong | Apr. 10, 1888 |
| 2,441,896 | Moir | May 18, 1948 |
| 2,561,943 | Moulton | July 24, 1951 |
| 2,571,927 | Neumann | Oct. 16, 1951 |
| 2,614,138 | Jacquier | Oct. 14, 1952 |
| 2,651,669 | Neumann | Sept. 8, 1953 |

FOREIGN PATENTS

| 22,281 | Great Britain | Oct. 10, 1911 |